(12) United States Patent
Ishida

(10) Patent No.: US 6,356,770 B1
(45) Date of Patent: Mar. 12, 2002

(54) COMPOSITE MOBILE COMMUNICATION DEVICE

(75) Inventor: Takayasu Ishida, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/393,468

(22) Filed: Sep. 10, 1999

(30) Foreign Application Priority Data

Sep. 11, 1998 (JP) ............................................. 10-257713

(51) Int. Cl.⁷ ................................................. H04B 1/38
(52) U.S. Cl. ........................ 455/553; 455/575; 455/426; 370/347
(58) Field of Search ................................. 455/426, 422, 455/550, 552, 553, 575, 454, 86, 84, 88, 73; 370/280, 294, 321, 337, 347

(56) References Cited

U.S. PATENT DOCUMENTS 5,896,562 A * 4/1999 Heinonen ..................... 455/76
6,088,348 A * 7/2000 Bell, III et al. .............. 455/552

FOREIGN PATENT DOCUMENTS

| JP | 9-163450 | 6/1997 |
| WO | WO 96/05707 | 2/1996 |
| WO | WO 98/25353 | 6/1998 |
| WO | WO 99/16273 | 4/1999 |

* cited by examiner

Primary Examiner—Doris H. To
(74) Attorney, Agent, or Firm—Scully, Scott, Murphy & Presser

(57) ABSTRACT

A composite mobile communication device allowing the reduced amount of hardware and a high-speed data communication is disclosed. One communication circuit uses a local oscillation signal of the other communication circuit to allow a one-frame-two-slot assignment communication on time-division duplex scheme when the other communication circuit does not operate. Since the local oscillation signal of the other communication circuit is used, there is no need of a local circuit to perform the one-frame-two-slot assignment communication.

13 Claims, 5 Drawing Sheets

COMPOSITE MOBILE COMMUNICATION DEVICE

BACKGROUND OF THE INVENTION

1. Field of the Invention

The present invention relates to a composite mobile communication device operable in different mobile communications system such as both PHS (personal handy phone system) and PDC (personal digital cellular) system, and more specifically, it relates to a local circuit of the mobile communication device.

2. Description of the Related Art

In a mobile communication terminal such as a digital mobile phone, a local circuit including an oscillator and a phase-locked loop (PLL) circuit is used particularly for frequency conversion at the time of transmission and reception. In general, the mobile communication terminal is provided with a single local circuit for a radio-frequency (RF) stage.

With the progress of compound of movable terminals, composite terminals compatible with either of PHS and PDC have been used for utilizing the advantages of both of them.

For example, Japanese Patent Laid Open Application (JP-A) No. 9-163450 discloses an example of such a composite terminal. More specifically, the conventional composite mobile terminal for both PDC and PHS is composed of a dual-mode receiver, a dual-mode transmitter, and a controller. The dual-mode receiver includes a RF local oscillation circuit for supplying two local oscillation signals for PHS and PDC. The dual-mode transmitter includes a local oscillation circuit for PHS and another local oscillation circuit for PDC. Such a configuration is capable of realizing both functions of the cordless type radio phone and the cellular type radio phone.

With the recent spread of mobile computing, the demand for high-speed data communication grows more and more. To achieve high-speed data communication in a PHS system, for example, a 64 Kbps communication rate of ISDN (integrated services digital network), two-slot assignment for each of transmission and reception timings in a frame is employed on time-division duplex (hereinafter, called "one-frame-two-slot T/R assignment"). More specifically, two transmission slots and two reception slots for a TDMA/TDD frame are used for high-speed data communication. In multi-carrier TDMA/TDD system such as the PHS system, therefore, the RF stage needs two local oscillators which can generate different local frequencies corresponding to two slots of the one-frame-two-slot T/R assignment, respectively.

In a PHS/PDC-composite mobile terminal which can provide the one-frame-two-slot T/R assignment, it is considered that a switch is provided in the PHS RF stage to select one of the two local oscillators for two slots of the one-frame-two-slot T/R assignment depending on which one of the two slots the current timing is.

Since two PHS local circuits are prepared for executing the one-frame-two-slot T/R assignment, however, the circuit configuration of the PHS transceiver becomes complicated and the amount of hardware is increased. The increased size and weight should be avoided.

SUMMARY OF THE INVENTION

An object of the present invention is to provide a composite mobile communication device which allows the high-speed communication without increasing in size and weight.

Another object of the present invention is to provide a composite mobile communication device which can obtain the high-speed communication according to the one-frame-two-slot T/R assignment on TDD scheme with reduced amount of hardware.

According to the present invention, a mobile communication device is selectively operable in first and second digital communication schemes. The mobile communication device includes; a first local circuit for generating a first local oscillation signal to supply it to a first communication circuit for the first digital communication scheme; and a second local circuit for generating a second local oscillation signal to supply it to a second communication circuit for the second digital communication scheme. The mobile communication device further includes a switching circuit for switching the first local oscillation signal between a first frequency and a second frequency. One of the first frequency and the second frequency is produced from the second local oscillation signal.

The first digital communication scheme preferably includes a time-division duplex scheme allowing a one-frame-two-slot assignment communication by which the first frequency and the second frequency are assigned to two different time slots for each of transmission and reception, respectively.

Further preferably, the first digital communication scheme is a digital cordless phone scheme and the second digital communication scheme is a digital cellular phone scheme.

According to another aspect of the present invention, a first local oscillation signal is generated which is used for a first communication circuit for the first digital communication scheme and a second local oscillation signal is generated which is used for a first communication circuit for the first digital communication scheme. A third local oscillation signal is produced from the second local oscillation signal. When the first communication circuit operates according to a one-frame-two-slot assignment communication on time-division duplex scheme, the first local oscillation signal and the third local oscillation signal are selectively supplies to the first communication circuit depending on two different time slot timings of the one-frame-two-slot assignment.

Preferably, when the second communication circuit is in a reception-OFF state in an intermittently receiving mode, the first local oscillation signal and the third local oscillation signal are selectively supplied to the first communication circuit. When the second communication circuit is in a reception-ON state in the intermittently receiving mode, the first local oscillation signal to supplied to the first communication circuit according to a one-frame-one-slot assignment communication on the time-division duplex scheme.

DESCRIPTION OF THE PREFERRED EMBODIMENT

Hereinafter, an embodiment of the present invention will be described, taking a combination of PHS and PDC as an example.

Figure 1:
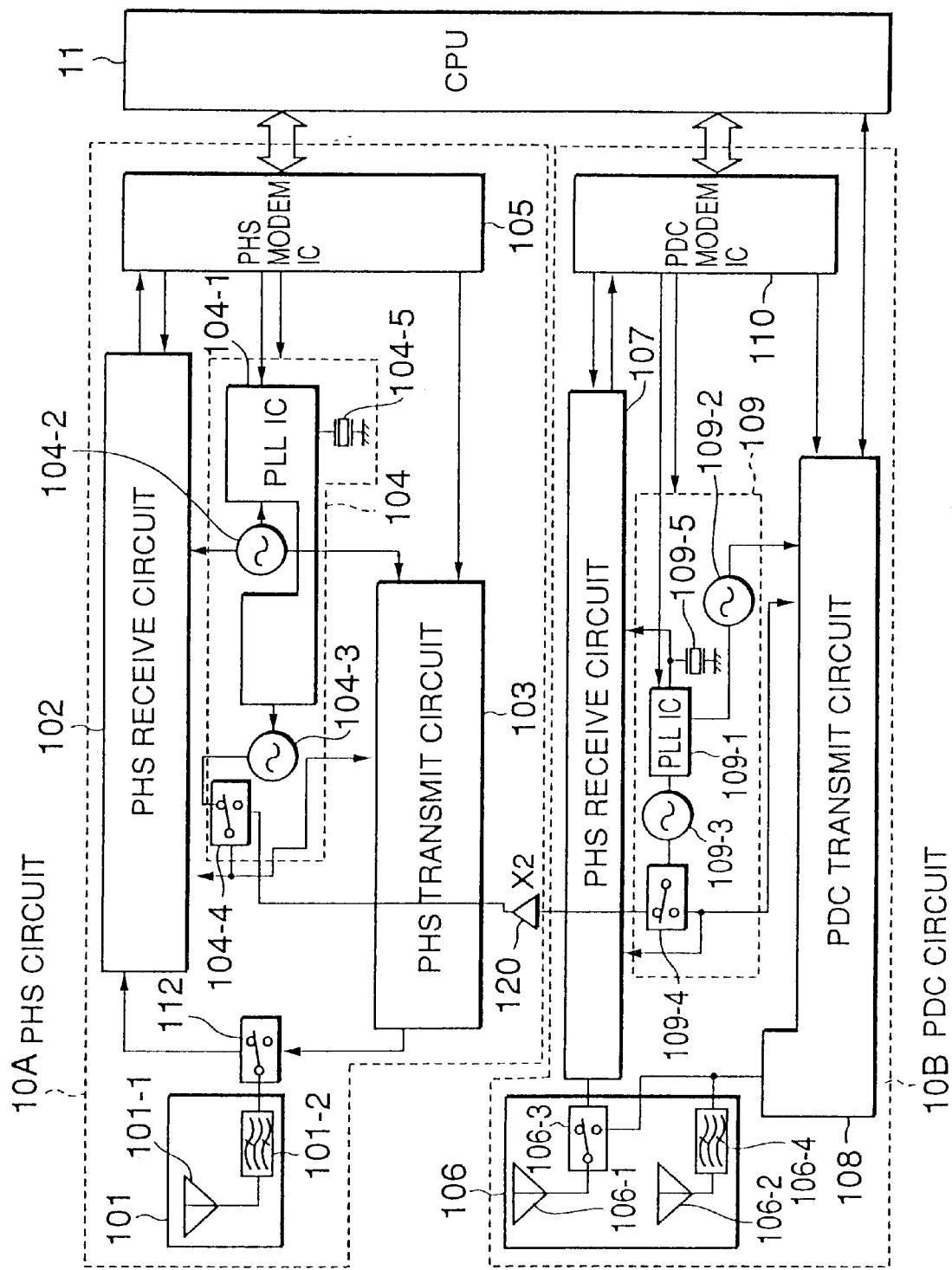
FIG. 1 is a block diagram showing the configuration of an embodiment of the present invention.

Referring to FIG. 1, a PHS built-in type PDC phone is mainly comprised of a PHS circuit 10A, a PDC circuit 10B, and a processor (CPU) 11. The CPU 11 controls the PHS circuit 10A and the PDC circuit 10B as described later.

The PHS circuit 10A includes a PHS local circuit 104 having a first local oscillator 104-3 and a second local oscillator 104-2 which are controlled by a PLL circuit 104-1. The first PHS local signal generated by the first local oscillator 104-3 is supplied to a PHS receive circuit 102 and a PHS transmit circuit 103 through a local frequency selection switch 104-4.

The PDC circuit 10B includes a PDC local circuit 109 having a first local oscillator 109-3 and a second local oscillator 109-2 which are controlled by a PLL circuit 109-1. The first PDC local signal generated by the first local oscillator 109-3 is supplied to a PDC receive circuit 107 and a PDC transmit circuit 108 through a switch 109-4.

As described later, when the PHS circuit 10A operates according to the one-frame-two-slot T/R assignment and the PDC circuit 10B is on an intermittent receiving operation, the switch 109-4 is controlled depending on the intermittent receiving timing and the one-frame-two-slot T/R timing.

More specifically, the first PDC local signal is supplied to the PHS circuit 10A through the switch 109-4 and a frequency multiplier 120 at one slot timing of the one-frame-two-slot T/R assignment. The first PDC local signal is supplied to the PDC circuit 10B at the intermittent-ON timing. On the other hand, the local frequency selection switch 104-4 selects the first PHS local signal generated by the first local oscillator 104-3 at the other slot timing of the one-frame-two-slot T/R assignment. The local frequency selection switch 104-4 selects the output of the frequency multiplier 120 the one slot timing of the one-frame-two-slot T/R assignment. In the embodiment for PHS and PDC, the frequency multiplier 120 multiplies the frequency of the first PDC local signal by a factor of 2.

Hereinafter, the present embodiment will be described in detail with reference to the drawings.

Figure 2:
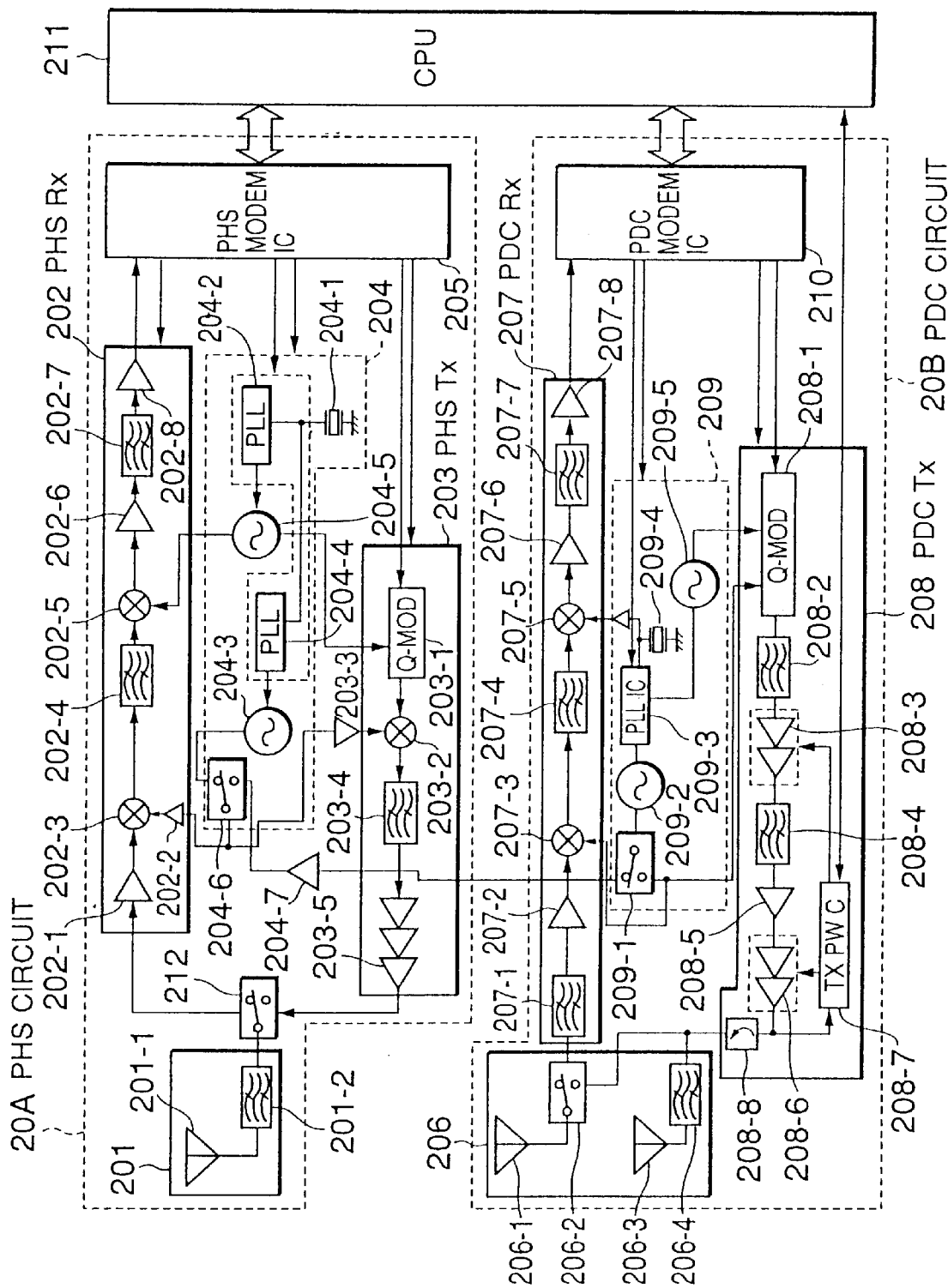
FIG. 2 is a block diagram showing the detailed configuration of an embodiment of the present invention.

As shown in FIG. 2. the PHS receive circuit 102 and the PHS transmit circuit 103 are connected with a PHS antenna unit 101 via a switch 112. The PHS receive circuit 402 outputs PHS received data to the CPU 11 via the PHS modem IC 105.

When the PHS circuit 10A tries to operate according to the one-frame-two-slot T/R assignment, the receiving signal level is used to determine whether two or more idle slots are available in the base station in which the location registration of the mobile terminal itself has been made. In the case where two or more idle slots is available, the link establishing operation for the one-frame-two-slot T/R assignment is conducted with the base station.

The CPU 11 controls the PHS modem IC 105 and the PDC modem IC 110. Under the control of the CPU 11, the PHS modem IC 105 sets the PHS local circuit 104 to produce a PHS local frequency to be used for transmission and reception. Similarly, the PDC modem SC 110 sets the PDC local circuit 109 to produce a PDC local frequency to be used for transmission and reception. The frequency setting data are supplied to the PLL IC 104-1 of the PHS local circuit 104 and the PLL IC 109-1 of the PDC local circuit 109.

As shown in FIG. 2, a PHS receive circuit 202 has a low-noise amplifier (LNA) 102-1 for amplifying a radio signal received by a PHS antenna unit 201, a first mixer (RX-MIX1) 202-3 for frequency conversion of the received radio signal to a first Intermediate frequency signal (IF1), an amplifier (RXLoAMP) 202-2 for amplifying a PHS first local signal to be supplied to the first mixer 202-3, an IF1 filter 202-4 for filtering out undesired components of the IF1 signal which is obtained by the frequency conversion at the first mixer 202-3, a second mixer (RX-MIX2) 202-5 for frequency conversion of the IF1 signal to a second intermediate frequency signal (IF2), a first intermediate amplifier (IF-AMP1) 202-6 for amplifying the IF2 signal, an IF2 filter 202-7 for filtering out undesired components of the IF2 signal, and a second intermediate amplifier (IF-AMP2) 202-8 for amplifying the IF2 signal output from the IF2 filter 202-7.

A PHS transmit circuit 203 has a quadrature modulator 203-1 for modulating the second local signal supplied from the second local oscillator 204-5 according to transmission data supplied from a PHS modem IC 205, a mixer (TX-MIX) 203-2 for frequency conversion of the modulated signal into a transmission radio frequency, an amplifier (TXLoAMP) 203-3 for amplifying the first local signal output from the local frequency selection switch 204-6, wherein the amplified first local signal is supplied to the mixer (TX-MIX) 503-2, a TX filter 203-4 for filtering out undesired components of the transmission radio signal, and a power amplifier (PA) 203-5 for amplifying the output of the TX filter 503-4 to a required output power level.

A PHS local circuit 204 comprises a PLL IC1 (including PLLs 204-2, 204-4) for controlling a voltage-controlled oscillator (VCO1) 204-3 and a voltage-controlled oscillator (VCO2) 204-5 according to the frequency setting data supplied from the PHS modem IC 205. The PHS local circuit 204 further comprises a crystal oscillator (TCXO1) 204-1 for supplying a reference clock to the PLLs 204-2 and 204-4. The respective voltage-controlled oscillators 204-3 and 204-5 change in oscillation frequency according to the control voltages supplied from the PLLs 204-4 and 204-2.

The local frequency selection switch 204-6 switches between two states. In the first state, the local frequency selection switch 204-6 selects the first PHS local signal of the VCO 204-3 and outputs it to the first mixer 202-3 through the amplifier 202-2 and to the mixer 203-2 through the amplifier 203-3. In the second state, the local frequency selection switch 204-6 selects the PDC first local signal received from the PDC local circuit 209 through a frequency multiplying amplifier 204-7 and outputs it to the first mixer 202-3 through the amplifier 202-2 and to the mixer 203-2 through the amplifier 203-3. The frequency multiplying amplifier 204-7 multiplies the frequency of the PDC first local signal by a factor of 2.

The PDC local circuit 209 has a PLL IC 209-3 for controlling voltage-controlled oscillators (VCO3, VCO4) 209-2, 209-5 according to the frequency setting data supplied from a PDC modem IC 210. The PDC local circuit 209 further includes a crystal oscillator (TCXO2) 209-4 for supplying a reference clock to the PLL IC 209-3. The voltage-controlled oscillators 209-2 and 209-5 change in oscillation frequency according to the control voltages input from the PLL IC 209-3.

The PDC local circuit 209 further includes a switch 209-1 which switches between two states. In the first state, the switch transfers the first PDC local signal of the VCO 209-2 to a quadrature modulator 208-1 and a first mixer 207-3. In the second state, the switch transfers the first PDC local signal to the local frequency selection switch 204-6 of the PHS local circuit 204 through the frequency multiplying amplifier 204-7.

The frequency setting data applied to the PLLs 204-2, 204-4, and 209-3 is well known. Further, the PDC circuit 20B is also well known. For example, the PDC receive circuit 207 comprises a filter 207-1, an amplifier 207-2, a first mixer 207-3, an IF1 filter 207-4, a second mixer 207-5, amplifiers 207-6, 207-8, and an IF2 filter 207-7. The output of the switch 209-1 is supplied to the first mixer 507-3 of the PDC receive circuit 207 and the quadrature modulator 208-1 of the PDC transmit circuit 208. Moreover, the PDC transmit circuit 208 comprises a quadrature modulator 208-1, a gain variable amplifiers 208-3, 208-5, filters 208-2, 208-4, and a transmission output power controller 208-7.

Operation

Figure 3:
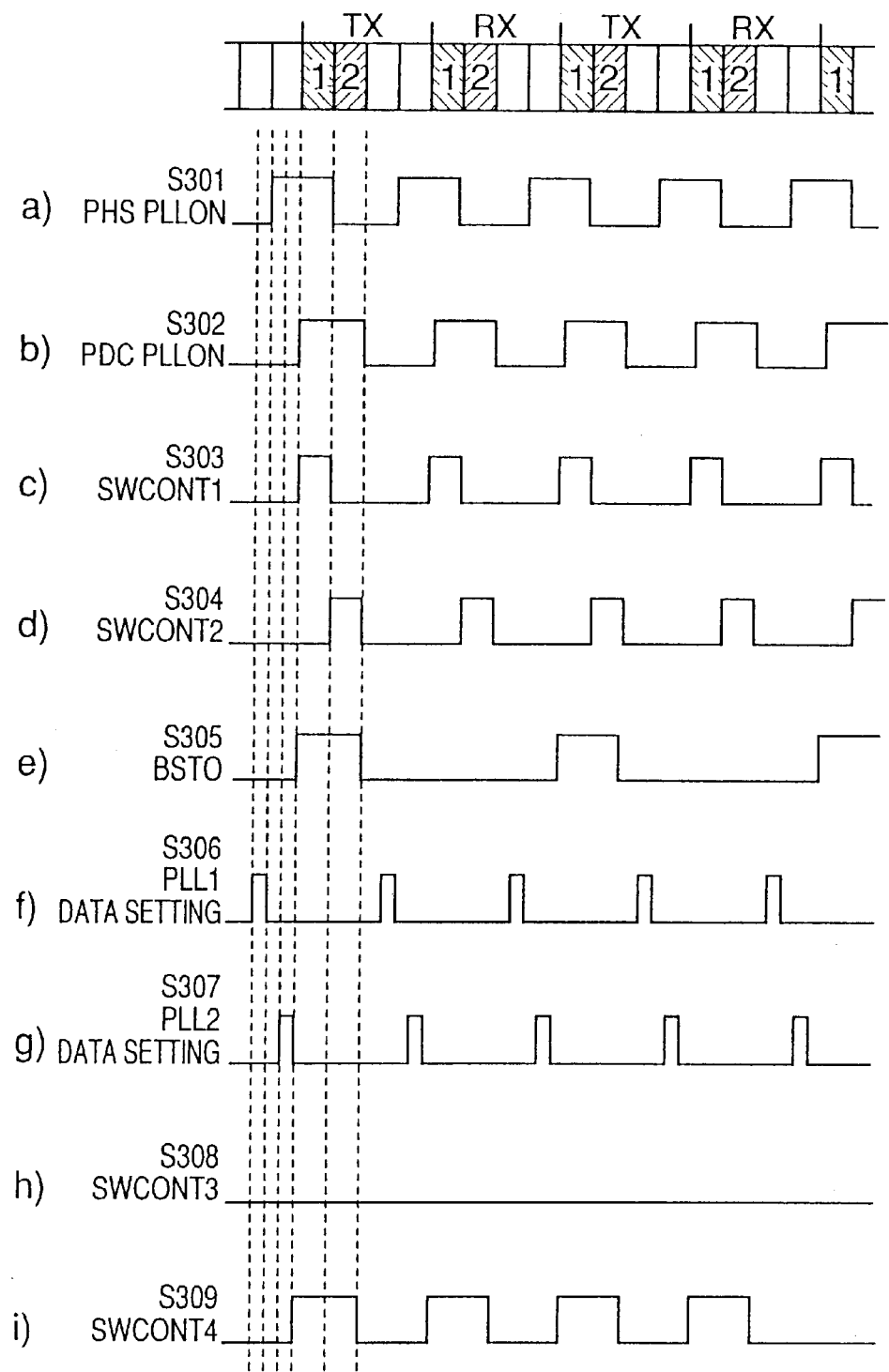
FIG. 3 is a timing chart for explaining the timing operation of an embodiment of the present invention.

As shown in FIG. 3, it is assumed that the PHS circuit 20A performs the one-frame-two-slot T/R operation such that two different frequencies are assigned to two consecutive T/R slots. In consideration of the time required for frequency stability in the PLL ICs, the CPU 211 raises the PHS PLL ON signal S301 and the PDC PLL ON S302 before each transmission/reception slot. When the PHS PLL ON signal (S301) goes high, the PLLs 204-2 and 204-4 are powered on to start controlling the VCOs 204-5 and 204-3, respectively. Similarly, when the PDC PLL ON signal (S302) goes high, the PLLS 209-3 is powered on to start controlling the VCOs 209-2 and 209-5.

The local frequency selection switch 204-6 selects the output of the VCO 204-3 when the switch control (SWCONT1) signal (S303) is high. The local frequency selection switch 204-6 selects the output of the frequency multiplying amplifier 204-7 when the switch control (SWCONT2) signal (S304) is high.

A BSTO signal (S305) indicates the transmission timing of the PHS transmit circuit 203. In this example, the BSTO signal is high during the first and second transmission time slots.

A frequency data setting signal (S306) for PHS PLLs 204-2 and 204-4 goes high to set the respective VCOs 204-3 and 204-5 to designated local frequencies just before the PHS PLL ON signal S301 goes high. Similarly, a frequency data setting signal (S307) for PDC PLL 209-3 goes high to set at least the VCO 209-2 to a designated local frequency just before the PDC PLL ON signal S302 goes high.

When a switch control (SWCONT3) signal (S308) is high, the switch 209-1 transfers the output of the VCO 209-2 to the PDC receive circuit 207 and the PDC transmit circuit 208. When a switch control (SWCONT4) signal (S309) is high, the switch 209-1 transfers the output of the VCO 209-2 to the frequency multiplying amplifier 204-7.

Figure 4:
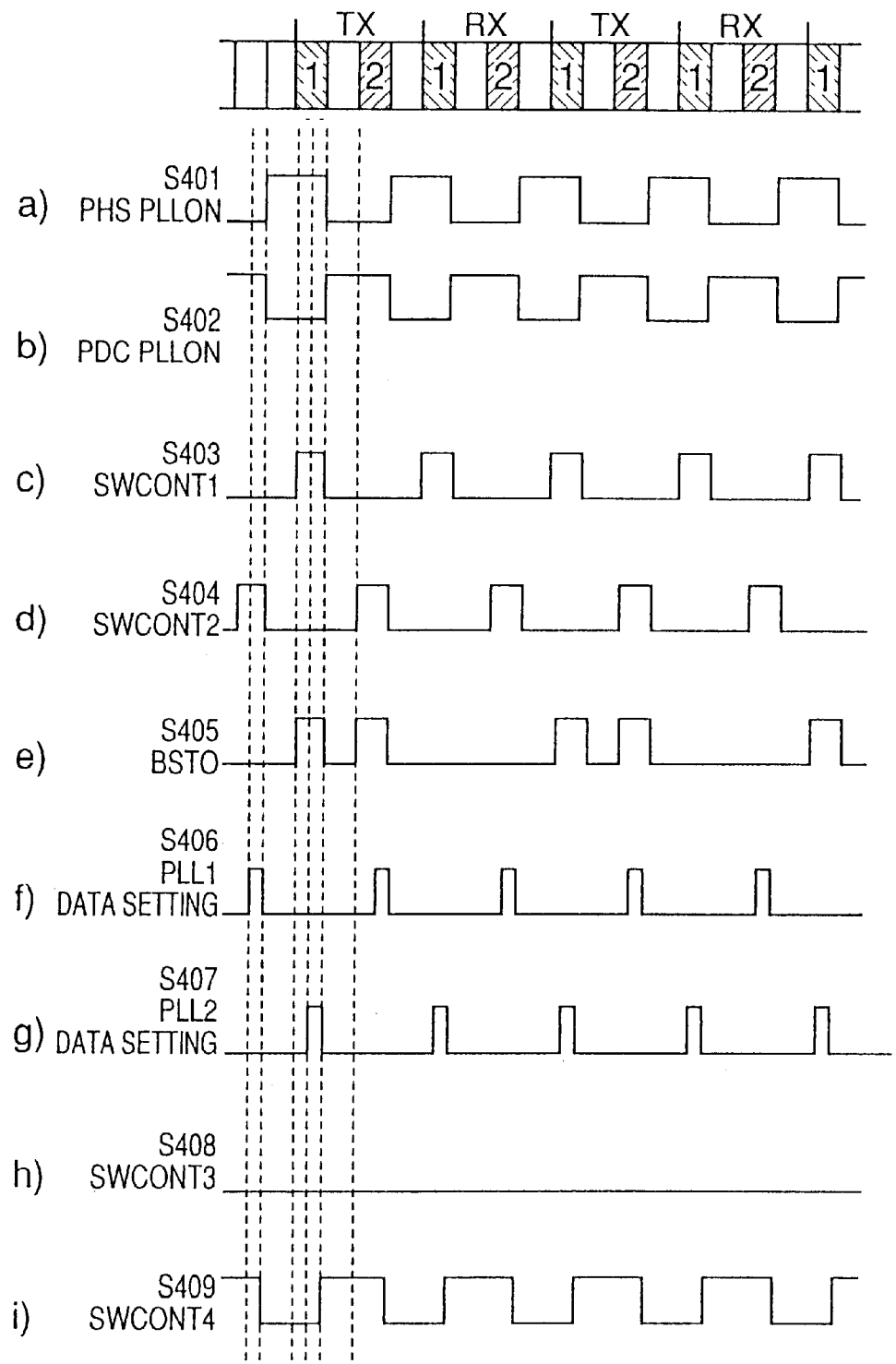
FIG. 4 is a timing chart for explaining the timing operation of an embodiment of the present invention.

As shown in FIG. 4, similarly. the PHS circuit 20A performs the one-frame-two-slot T/R operation using the local signal of the VCO 209-2 of the PDC local circuit 209 such that two different frequencies are assigned to two T/R slots at intervals of one slot. The basic operations are substantially the same as those of FIG. 3 except for the timing of each signal.

More specifically, the CPU 211 raises the PHS PLL ON signal and the PDC PLL ON before each transmission/reception slot. When the PHS PLL ON signal (S401) goes high, the PLLs 204-2 and 204-4 are powered on to start controlling the VCOs 204-5 and 204-3, respectively. Similarly, when the PDC PLL ON signal (S402) goes high, the PLLs 209-3 is powered on to start controlling the VCOs 209-2 and 209-5.

The local frequency selection switch 204-6 selects the output of the VCO 204-3 when the switch control (SWCONT1) signal (S403) is high. The local frequency selection switch 204-6 selects the output of the frequency multiplying amplifier 204-7 when the switch control (SWCONT2) signal (S404) is high.

A BSTO signal (S405) indicates the transmission timing of the PHS transmit circuit 203. In this example, the BSTO signal is high during the first and second transmission time slots.

A frequency data setting signal (S406) for PHS PLLs 204-2 and 204-4 goes high to set the respective VCOs 204-3 and 204-5 to designated local frequencies just before the PHS PLL ON signal S301 goes high. Similarly, a frequency data setting signal (S407) for PDC PLL 209-3 goes high to set at least the VCO 209-2 to a designated local frequency just before the PDC PLL ON signal S302 goes high.

When a switch control (SWCONT3) signal (S408) is high, the switch 209-1 transfers the output of the VCO 209-2 to the PDC receive circuit 207 and the PDC transmit circuit 208. When a switch control (SWCONT4) signal (S409) is high, the switch 209-1 transfers the output of the VCO 209-2 to the frequency multiplying amplifier 204-7.

Figure 5:
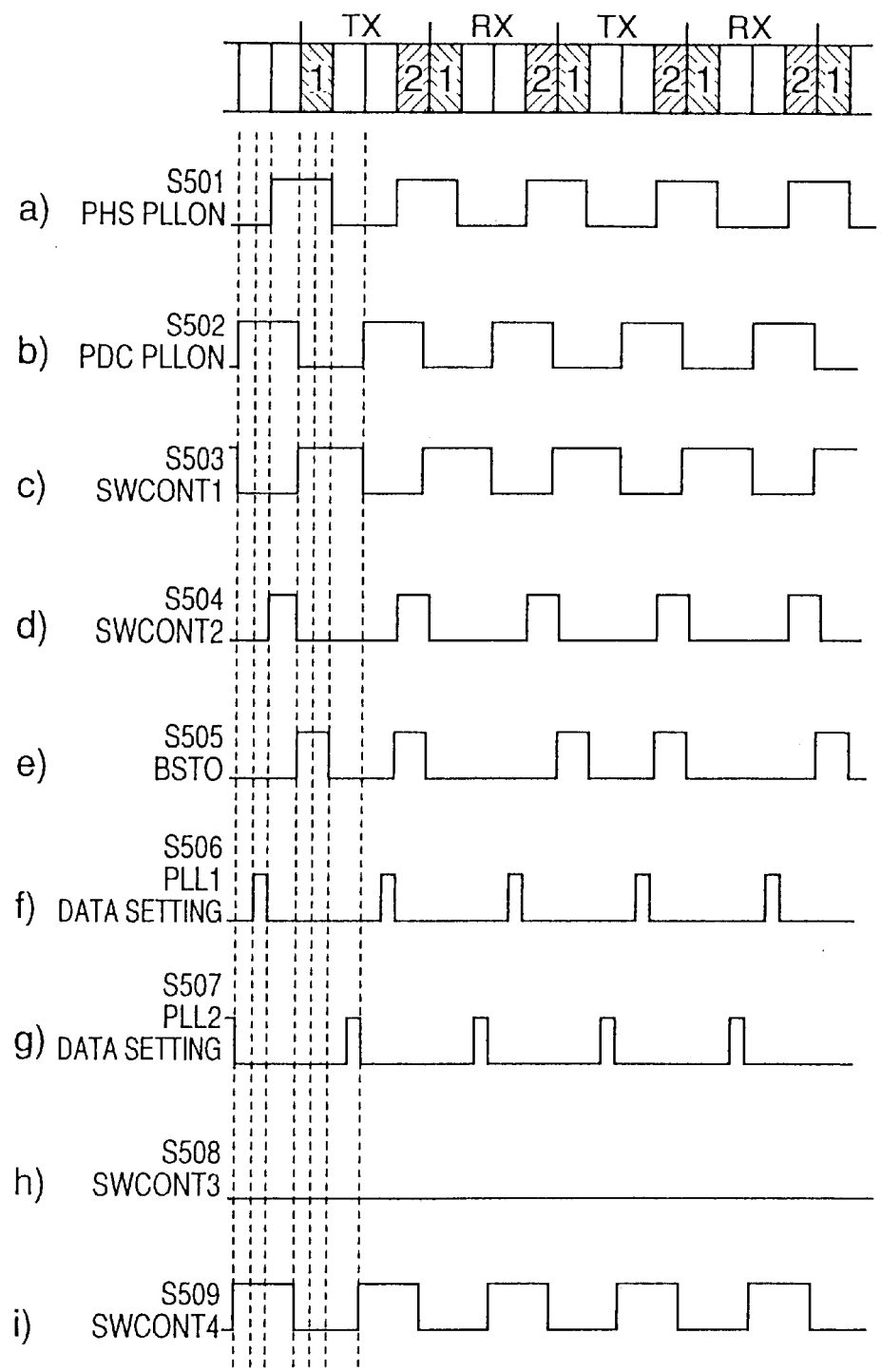
FIG. 5 is a timing chart for explaining the timing operation of an embodiment of the present invention.

FIG. 5 shows the case where the PHS circuit 20A performs the one-frame-two-slot T/R operation using the local signal of the VCO 209-2 of the PDC local circuit 209 such that two different frequencies are assigned to two T/R slots at intervals of two slots. Since the basic operations are substantially the same as described above, the description is omitted.

In this manner, in the case where the PDC circuit 20B executes the intermittently receiving operation, the PHS circuit 20A executes the one-frame-two-slot T/R communication. By using the switch 209 of the PDC local circuit 209 to input the local signal of the VCO 209-2, the PHS circuit 20A is capable of performing the high-speed data communication according to the one-frame-two-slot T/R assignment. There is no need of another local circuit for use in the one-frame-two-slot transmission/reception.

The embodiment of the present invention has been described, taking a combination of PHS and PDC as an example. The present invention can be applied to a combination of another digital cordless phone system and another digital cellular system. In such a case, the frequency multiplier amplifier (120 or 204-7) may be set to a multiplication factor determined depending on frequency bands used in the systems.

The frequency multiplier amplifier (120, 204-7) may be composed of an amplifier and a band-pass filter for passing only a desired frequency band. Since a VCO generates a frequency that is an integral multiple of the fundamental frequency, the frequency multiplier amplifier amplifies the oscillation signal of the VCO before passing through the band-pass filter to produce a desired integral multiple of the fundamental frequency.

According to the present invention, the PDC circuit operating in the intermittently receiving state is utilized so that the PDC local circuit is used as a second PHS local circuit during the period when the PDC circuit is not on receiving operation. Therefore, a further PHS local circuit needs not be prepared for corresponding to the PHS one-frame-two-slot T/R assignment. In other words, this allows one local circuit to be removed from the conventional composite mobile terminal comprising two local circuits for the PHS, and thus the number of circuit parts can be reduced, resulting in a small size and light weight mobile terminal capable of obtaining the high-speed data communication according to the PHS one-frame-two-slot T/R assignment.

Furthermore, since the number of control conductor lines for the PLL IC can be reduced, the printed wiring board can be highly integrated. In the case of a PHS built-in type PDC phone with the PHS circuit provided as a sub-board and connected with the PDC circuit main board by a connector, the number of connector terminals can be also reduced.

As described above, according to the present invention, the PDC circuit operating in the intermittently receiving state is utilized so that the PDC local circuit can be used as a second PHS local circuit during the period when the PDC circuit is not on receiving operation. Therefore, two dedicated PHS local circuits need not be prepared for providing the PHS one-frame-two-slot T/R assignment and thereby one local circuit can be removed from the conventional circuit with two local circuits provided. Therefore, according to the present invention, a small-size and light-weight composite mobile communication device can be realized.

Furthermore, since the wiring is simplified, the printed wiring board can be highly integrated, resulting in further small-size and light-weight composite mobile communication device.

What is claimed is:

1. A mobile communication device selectively operable in first and second digital communication schemes, comprising:

a first local circuit for generating a first local oscillation signal to supply it to a first communication circuit for the first digital communication scheme;

a second local circuit for generating a second local oscillation signal to supply it to a second communication circuit for the second digital communication scheme; and a switching circuit for switching the first local oscillation signal between a first frequency and a second frequency, wherein one of the first frequency and the second frequency is produced from the second local oscillation signal.

2. A mobile communication device according to claim 1, wherein:

the first digital communication scheme includes a time-division duplex scheme allowing a one-frame-two-slot assignment communication by which the first frequency and the second frequency are assigned to two different time slots for each of transmission and reception, respectively.

3. A mobile communication device according to claim 2, wherein the first digital communication scheme is a digital cordless phone scheme and the second digital communication scheme is a digital cellular phone scheme.

4. A mobile communication device according to claim 3, wherein the switching circuit includes;

a frequency multiplier for multiplying a frequency of the second local oscillation signal to produce the one of the first frequency and the second frequency.

5. A mobile communication device selectively operable in first and second digital communication schemes, comprising:

a first local oscillator for generating a first local oscillation signal of a first frequency;

a second local oscillator for generating a second local oscillation signal of a second frequency;

a frequency changer for changing the second local oscillation signal to a third local oscillation signal of a third frequency:

a first switch for selecting one of the first local oscillation signal and the third local oscillation signal to supply a selected one to a first communication circuit for the first digital communication scheme;

a second switch for selecting one of a first path to the first switch and a second path to a second communication circuit for the second digital communication scheme to supply the second local oscillation signal through a selected path; and a controller controlling the first and second local oscillators and the first and second switches according to the first and second digital communication schemes.

6. A mobile communication device according to claim 5, wherein the controller controls the first and second local oscillators and the first and second switches such that the first frequency and the third frequency are assigned to two different time slots for each of transmission and reception according to a one-frame-two-slot assignment communication on a time-division duplex scheme.

7. A mobile communication device according to claim 6, wherein the first digital communication scheme is a digital cordless phone scheme and the second digital communication scheme is a digital cellular phone scheme.

8. A mobile communication device according to claim 7, wherein the frequency changer multiplies the second frequency of the second local oscillation signal by a factor of 2 to produce the third frequency of the third local oscillation signal.

9. A mobile communication device according to claim 7, wherein the first digital communication scheme is PHS (personal handy-phone system) and the second digital communication scheme is PDC (personal digital cellular).

10. A control method for a mobile communication device selectively operable in first and second digital communication schemes, comprising the steps of:

generating a first local oscillation signal which is used for a first communication circuit for the first digital communication scheme;

generating a second local oscillation signal which is used for a first communication circuit for the first digital communication scheme;

producing a third local oscillation signal from the second local oscillation signal; and when the first communication circuit operates according to a one-frame-two-slot assignment communication on time-division duplex scheme, selectively supplying the first local oscillation signal and the third local oscillation signal to the first communication circuit depending on two different time slot timings of the one-frame-two-slot assignment.

11. A control method according to claim 10, wherein the first digital communication scheme is a digital cordless phone scheme and the second digital communication scheme is a digital cellular phone scheme.

12. A control method according to claim 11, wherein, when the second communication circuit is in a reception-OFF state in an intermittently receiving mode, the first local oscillation signal and the third local oscillation signal are selectively supplied to the first communication circuit.

13. A control method according to claim 12, wherein, when the second communication circuit is in a reception-ON state in the intermittently receiving mode, the first local oscillation signal is supplied to the first communication circuit according to a one-frame-one-slot assignment communication on the time-division duplex scheme.

* * * * *